United States Patent
Jia et al.

(10) Patent No.: US 8,099,517 B2
(45) Date of Patent: Jan. 17, 2012

(54) ASSIGNING PRIORITY TO NETWORK TRAFFIC AT CUSTOMER PREMISES

(75) Inventors: Lujun R. Jia, Foxboro, MA (US); Andrew F. Patka, Holliston, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 12/760,946

(22) Filed: Apr. 15, 2010

(65) Prior Publication Data

US 2010/0198989 A1 Aug. 5, 2010

Related U.S. Application Data

(63) Continuation of application No. 11/617,992, filed on Dec. 29, 2006, now Pat. No. 7,725,594.

(51) Int. Cl.
G06F 15/16 (2006.01)
G06F 15/173 (2006.01)

(52) U.S. Cl. ........................ 709/245; 709/238

(58) Field of Classification Search ........... 709/238–245
See application file for complete search history.

(56) References Cited

U.S. PATENT DOCUMENTS

| | | | |
|---|---|---|---|
| 6,577,628 B1 | 6/2003 | Hejza | |
| 6,598,057 B1* | 7/2003 | Synnestvedt et al. ................. | 1/1 |
| 6,611,522 B1 | 8/2003 | Zheng et al. | |
| 6,611,859 B1 | 8/2003 | Kohno | |
| 6,654,373 B1 | 11/2003 | Maher et al. | |
| 6,792,474 B1 | 9/2004 | Hopprich et al. | |
| 6,954,790 B2* | 10/2005 | Forslow ........................ | 709/227 |
| 6,954,800 B2 | 10/2005 | Mallory | |
| 6,956,818 B1 | 10/2005 | Thodiyll | |
| 7,050,445 B1 | 5/2006 | Zellner et al. | |
| 7,051,369 B1* | 5/2006 | Baba ................................. | 726/23 |
| 7,107,326 B1* | 9/2006 | Fijolek et al. .................. | 709/220 |
| 7,130,903 B2 | 10/2006 | Masuda | |
| 7,200,678 B1* | 4/2007 | Bettadahalli et al. ......... | 709/245 |
| 7,257,634 B2 | 8/2007 | Colby et al. | |
| 7,293,107 B1 | 11/2007 | Hanson et al. | |
| 7,356,598 B1 | 4/2008 | Giroir et al. | |
| 7,386,876 B2* | 6/2008 | Kim ................................. | 726/3 |
| 7,464,407 B2* | 12/2008 | Nakae et al. .................... | 726/22 |
| 2002/0023174 A1* | 2/2002 | Garrett et al. ................. | 709/245 |
| 2002/0188732 A1 | 12/2002 | Buckman et al. | |
| 2003/0208622 A1* | 11/2003 | Mosier ........................ | 709/244 |
| 2004/0158644 A1 | 8/2004 | Albuquerque et al. | |
| 2005/0122946 A1* | 6/2005 | Won ............................. | 370/338 |
| 2005/0175009 A1 | 8/2005 | Bauer | |
| 2005/0254440 A1* | 11/2005 | Sorrell ......................... | 370/264 |
| 2006/0029089 A1 | 2/2006 | Zellner et al. | |
| 2006/0050683 A1 | 3/2006 | Wall et al. | |
| 2006/0155563 A1* | 7/2006 | Banerjee et al. .................. | 705/1 |
| 2006/0195896 A1* | 8/2006 | Fulp et al. ....................... | 726/11 |

OTHER PUBLICATIONS

Droms, R., "Dynamic Host Configuration Protocol," Network Working Group, Request for Comments: 2131, Mar. 1997.
Alexander et al., "DHCP Options and BOOTP Vendor Extensions," Network Working Group, Request for Comments: 2132, Mar. 1997.

* cited by examiner

*Primary Examiner* — Yasin Barqadle

(57) ABSTRACT

A device may receive a message from a client device and determine whether the message includes particular data. The device may identify an address within a particular address group when the message includes the particular data. The traffic associated with addresses within the particular address group are assigned priority over traffic associated with addresses outside the particular address group. The device may provide the identified address to the client device so that traffic associated with the client device receives priority over other traffic.

18 Claims, 7 Drawing Sheets

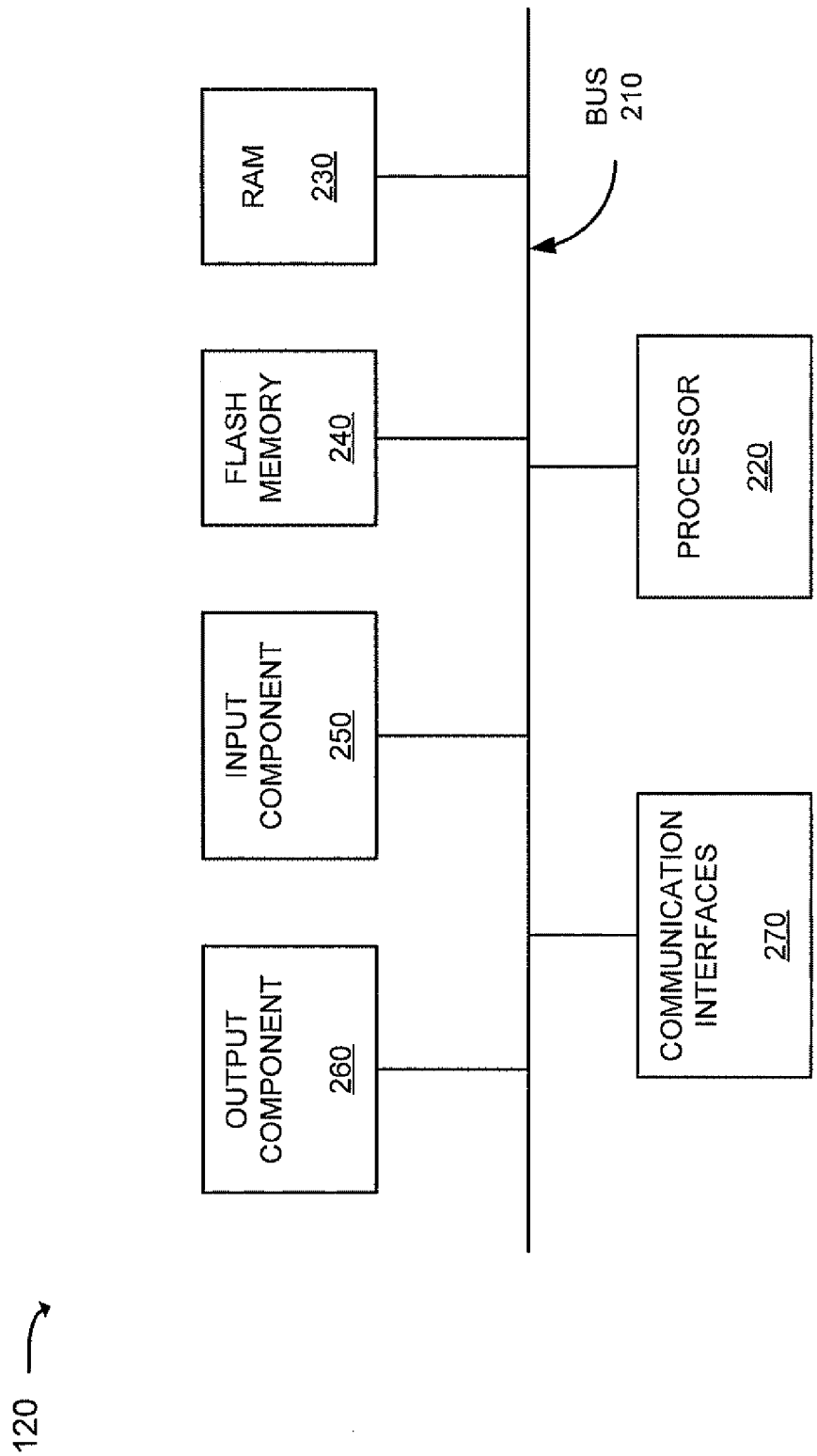

| OP | HTYPE | HLEN | HOPS |
|---|---|---|---|
| XID ||||
| SECS || FLAGS ||
| CIADDR ||||
| YIADDR ||||
| SIADDR ||||
| GIADDR ||||
| CHADDR ||||
| SNAME ||||
| FILE ||||
| OPTIONS ||||

FIG. 4

| OPTION CODE | OPTION LENGTH | VENDOR CLASS IDENTIFIER |

FIG. 5

ASSIGNING PRIORITY TO NETWORK TRAFFIC AT CUSTOMER PREMISES

RELATED APPLICATION

This application is a continuation of U.S. patent application Ser. No. 11/617,992, filed Dec. 29, 2006, which is incorporated herein by reference.

BACKGROUND

Some home users of the Internet share their Internet data connection with audio services (e.g., telephone services) and video services (e.g., television or video-on-demand services). As a result, these audio/video services often have to compete for bandwidth at the customer premises with standard Internet traffic. This can lead to suboptimal quality of the audio/video services.

BRIEF DESCRIPTION OF THE DRAWINGS

FIG. 2 is an exemplary diagram of components of the home router of FIG. 1;

FIG. 4 is a diagram of an exemplary format of a discover message;

FIG. 5 is a diagram of an exemplary format of a vendor class identifier option field of a discover message.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Implementations described herein may assign priority to network traffic at the customer premises, such as within a customer's household, to give higher priority to video and/or audio traffic and, thus, increase the quality of the video/audio data.

Figure 1:
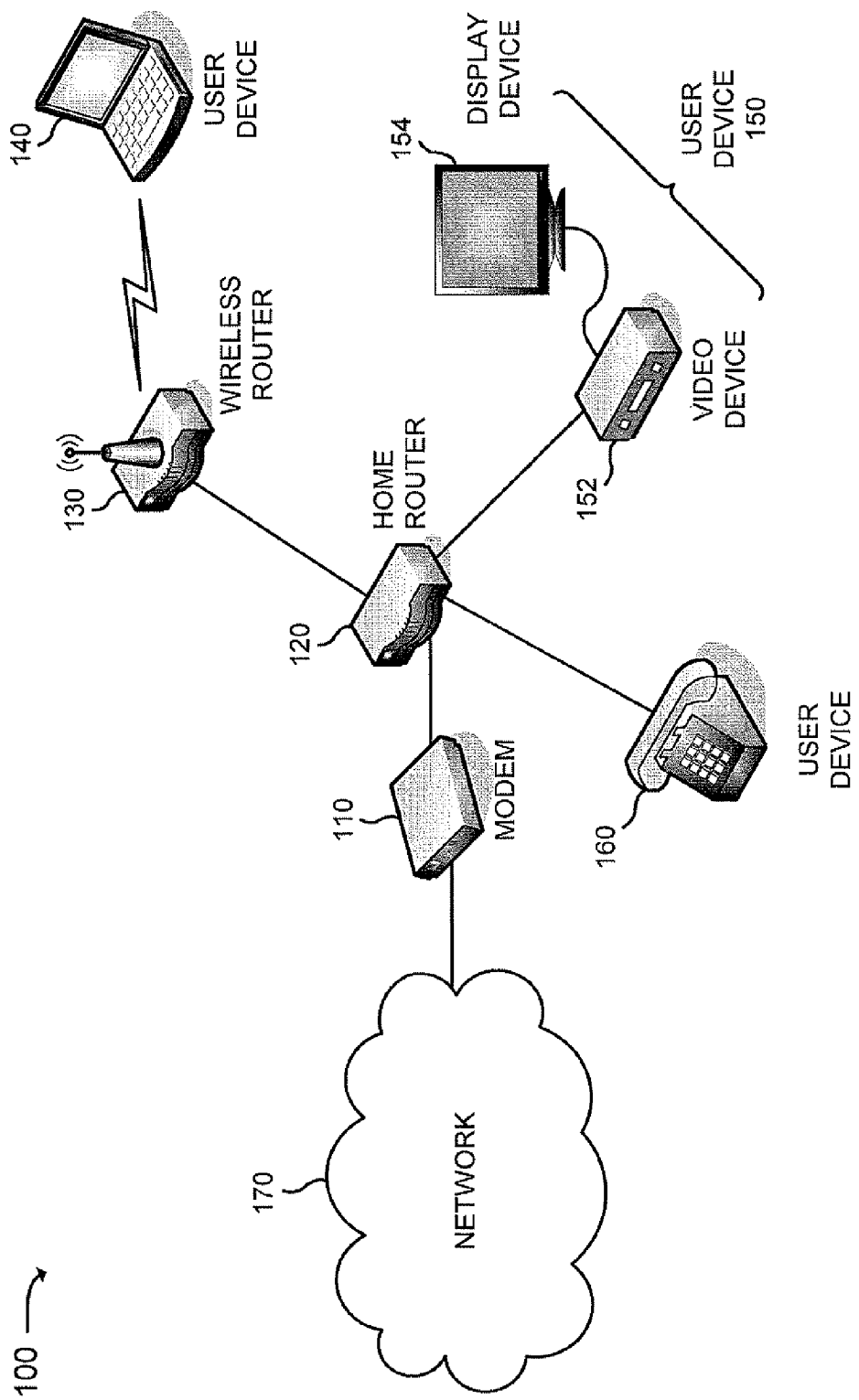
FIG. 1 is an exemplary diagram of a network in which systems and methods described herein may be implemented.

FIG. 1 is an exemplary diagram of a network 100 in which systems and methods described herein may be implemented. Network 100 may include customer premises equipment, such as a modem 110, a home router 120, a wireless router 130, and user devices 140-160, that are connectable to network 170. In practice, network 100 may include more, fewer, or different devices than are shown in FIG. 1. Also, two or more of these devices may be implemented within a single device, or a single device may be implemented as multiple, distributed devices. For example, modem 110, home router 120, and/or wireless router 130 may be implemented as a single device.

Modem 110 may include a device, such as a cable modem, a DSL modem, a dial-up modem, or another type of modem that processes data received on an external link (e.g., from network 170) for transmission on a local link (e.g., to home router 120), and vice versa.

Home router 120 may include a device that may provide connectivity between the customer premises equipment and network 170. In one implementation, home router 120 may function as a dynamic host configuration protocol (DHCP) server to assign network addresses, and provide other configuration information, to user devices 140-160. Home router 120 may also provide firewall functionality, such as packet filtering and protection against network attacks.

Wireless router 130 may include a device that may provide wireless connectivity to one or more user devices 140-160. For example, wireless router 130 may permit a wireless user device (e.g., user device 140) to connect to other customer premises equipment and/or gain access to network 170.

User devices 140-160 may include any type or form of computation or communication device that may communicate on network 170. User device 140 may include, for example, a personal computer, a laptop, a personal digital assistant (PDA), or another type of computation or communication device that may connect to wireless router 130 via a wireless connection. User device 150 may include a video device 152 and a display device 154. Video device 152 may include a set-top box or another type of device that is capable of providing video services. Display device 154 may include a monitor, television, or another type of device that is capable of displaying video data. User device 160 may include a telephone device or another type of device that is capable of providing telephone services.

Network 170 may include a wide area network (e.g., the Internet), an intranet, a telephone network (e.g., the Public Switched Telephone Network), or a combination of networks. Modem 110 may connect to network 170 via a wired or wireless connection.

FIG. 2 is an exemplary diagram of components of home router 120. Home router 120 may include a bus 210, a processor 220, a random access memory 230, a flash memory 240, an input component 250, an output component 260, and communication interfaces 270. Bus 210 may include a path that permits communication among the elements of home router 120.

Processor 220 may include a processor, microprocessor, or processing logic that may interpret and execute instructions. RAM 230 may include any type of dynamic storage device that may store information and instructions for execution by processor 220. Flash memory 240 may include any type of non-volatile storage device that may store information for use by processor 220.

Input component 250 may include a mechanism that permits an operator to input information to home router 120, such as a button, switch, input key, etc. Output component 260 may include a mechanism that outputs information to the operator, such as a display, one or more light emitting diodes (LEDs), a speaker, etc. Communication interfaces 270 may include any transceiver-like mechanisms that enable home router 120 to communicate with other devices and/or systems. For example, communication interfaces 270 may include one or more Ethernet interfaces, optical interfaces, coaxial interfaces, or the like.

As will be described in detail below, home router 120 may perform certain operations relating to the assignment of addresses to customer premises equipment and the subsequent processing of traffic for the customer premises equipment. Home router 120 may perform these operations in response to processor 220 executing software instructions contained in a computer-readable medium, such as RAM 230. A computer-readable medium may be defined as a physical or logical memory device and/or carrier wave.

The software instructions may be read into RAM 230 from another computer-readable medium, such as flash memory 240, or from another device via communication interfaces 270. The software instructions contained in RAM 230 may cause processor 220 to perform processes that will be described later. Alternatively, hardwired circuitry may be used in place of or in combination with software instructions to implement processes described herein. Thus, implementations described herein are not limited to any specific combination of hardware circuitry and software.

As explained above, home router 120 may be configured to function as a DHCP server. In this capacity, home router 120 may maintain a pool of addresses available for assignment to client devices, such as user devices 140-160. Home router 120 may provide a unique network address and other configuration parameters that a requesting device may need to communicate on network 170 using DHCP. Home router 120 may set a length of time, called a lease, for which a provided network address may be valid. Home router 120 may ensure that all network addresses are unique (i.e., no network address is assigned to a second client device while the first client device's assignment is valid (its lease has not expired)).

Figure 3A:
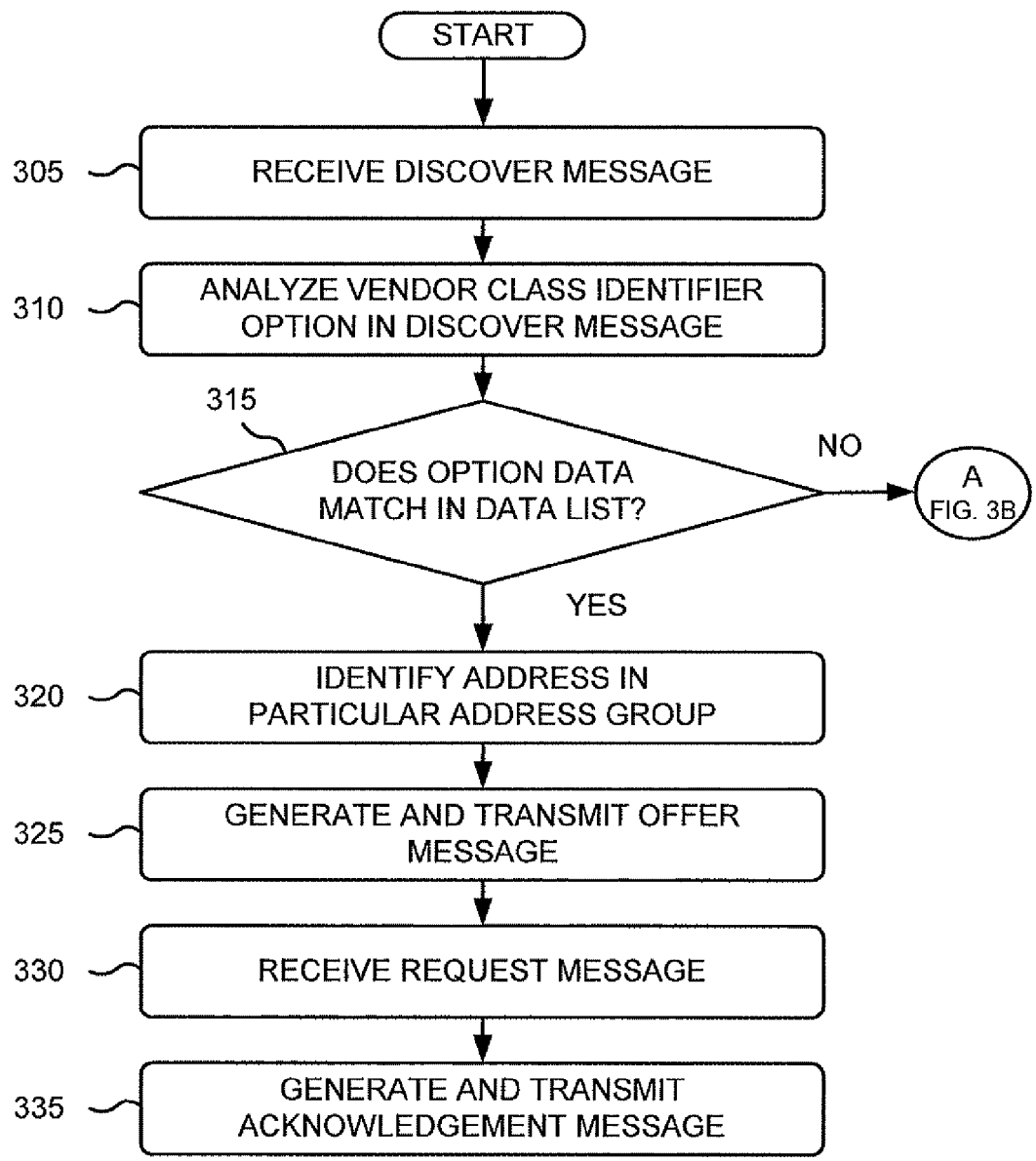
FIGS. 3A-3B depict a flowchart of an exemplary process for assigning a network address.
Figure 3B:
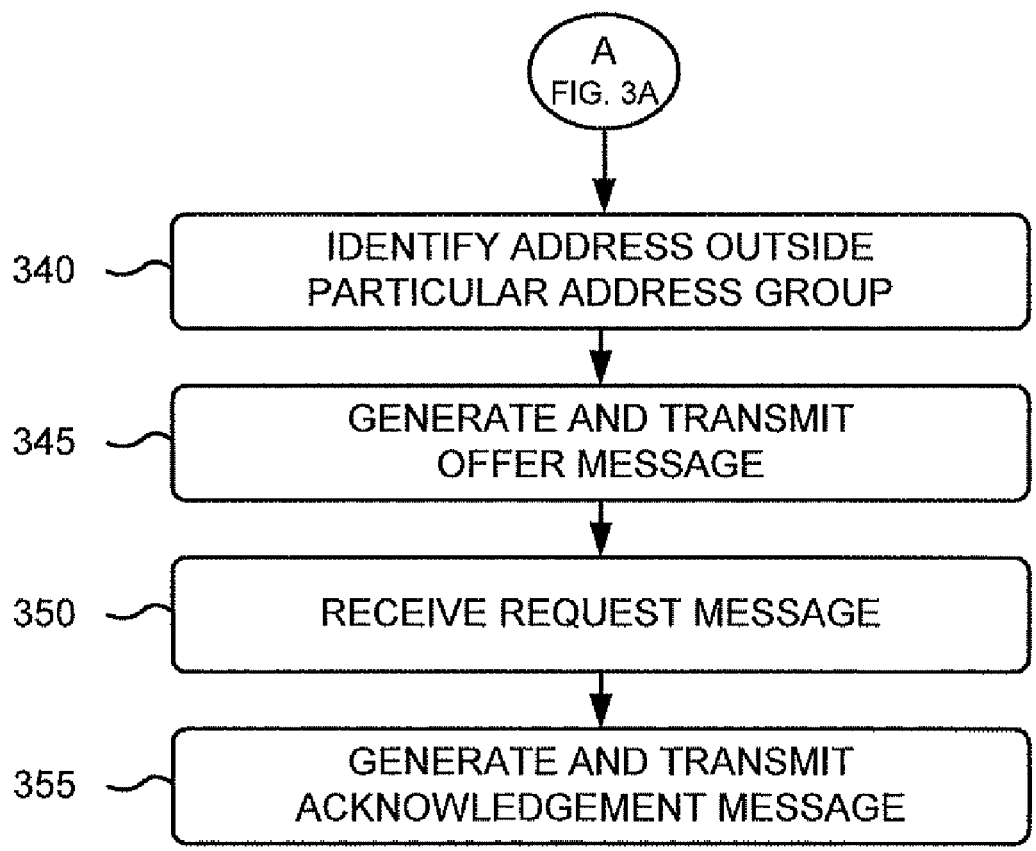

FIGS. 3A-3B depict a flowchart of an exemplary process for assigning a network address. In one implementation, the process of FIGS. 3A-3B may be performed by one or more software and/or hardware components within home router 120.

Processing may begin with a discover message being received (block 305) (FIG. 3A). For example, a client device, such as one of user devices 140-160, may generate a DHCP discover message that indicates that the client device desires to be configured for network access. The client device may broadcast the discover message to a predetermined broadcast address. The discover message may include options that suggest values for the network address and lease duration. The discover message may be received by home router 120. In one implementation, one or more relay devices may receive the discover message and pass the discover message to home router 120.

FIG. 4 is a diagram of an exemplary format of a discover message. In one implementation, as shown in FIG. 4, the discover message may include a message op code (op) field, a hardware address type (htype) field, a hardware address length (hlen) field, a hops field, a transaction id (xid) field, a seconds (secs) field, a flags field, a client IP address (ciaddr) field, a your IP address (yiaddr) field, a server IP address (siaddr) field, a relay agent IP address (giaddr) field, a client hardware address (chaddr) field, a server host name (sname) field, a boot file name (file) field, and an options field. Each of these fields is described in detail in R. Droms, "Dynamic Host Configuration Protocol," RFC 2131, March 1997, the contents of which is incorporated herein by reference.

The options field may permit configuration parameters and other control information to be passed from a client device to home router 120. The options field may have a fixed length or a variable length and may begin with a code number that uniquely identifies the option. One particular option ("option 60") may include the vendor class identifier option field. The vendor class identifier option field may be used by a client device to identify the vendor type and configuration of the client device. Vendors may choose to define specific vendor class identifiers to convey particular configuration or other identification information about a client device. In one implementation, a vendor class identifier may encode the client device's hardware configuration.

FIG. 5 is a diagram of an exemplary format of the vendor class identifier option field of a discover message. In one implementation, as shown in FIG. 5, the options field may include an option code field, an option length field, and a vendor class identifier field. The options code field may include the unique code corresponding to the vendor class identifier option (i.e., code "60"). The option length field may identify the length of the option data. The vendor class identifier field may include data that identifies hardware and/or software information relating to the client device.

Returning to FIG. 3A, the vendor class identifier option in the discover message may be analyzed (block 310). For example, home router 120 may determine whether the discover message includes a vendor class identifier option by, for example, looking for the unique code associated with the vendor class identifier option (i.e., code "60") in the options field of the discover message. If the discover message does not include the vendor class identifier option, home router 120 may assign a network address to the client device according to a standard process, such as the process described in R. Droms, "Dynamic Host Configuration Protocol," RFC 2131, March 1997. If the discover message includes the vendor class identifier option, home router 120 may determine the data stored in the vendor class identifier field.

It may be determined whether the data in the vendor class identifier field matches data in a list of predetermined data (block 315). In one implementation, the list of predetermined data may include one or more data items relating to particular video and/or audio devices. For example, one data item may include IP-STB to refer to an IP set-top box. Another data item may include IP-TEL to refer to an IP telephone device.

If the data in the vendor class identifier field matches data in the list of predetermined data (block 315—YES), then an address in a particular address group may be identified (block 320). For example, home router 120 may identify an available address in the particular address group. The particular address group may include a subset of the addresses in the address pool maintained by home router 120. Home router 120 may assign a higher priority to the addresses within the particular address group such that home router 120 may apply appropriate quality of service (QoS) policies to traffic associated with client devices to which these addresses are assigned. The QoS policies may provide traffic associated with these client devices strict priority over any best effort or background traffic. This higher (strict) priority may ensure the necessary QoS to provide quality video and/or audio data.

An offer message may be generated and transmitted to the client device (block 325). For example, home router 120 may generate an offer message that includes the identified address in, for example, the yiaddr field and possibly other configuration parameters in the options field. Home router 120 may transmit the offer message to the client device from which it received the discover message.

The client device may receive the offer message and analyze its contents. The client device may generate a request message that may identify home router 120 and may specify the desired network address and/or configuration parameters. The desired network address may match the address identified in the offer message. The client device may send the request message to home router 120 (e.g., by broadcasting or unicasting).

The request message may be received (block 330). For example, home router 120 may receive the request message and store the network address and/or configuration parameters for the client device in memory.

An acknowledgement message may be generated and transmitted (block 335). For example, home router 120 may generate an acknowledgement message that contains the network address, the configuration parameters, and/or a duration of the lease. Home router 120 may send the acknowledgement message to the client device. The client device may receive the acknowledgement message and check the configuration parameters contained in the acknowledgement message. The client device may also record the duration of the lease. At this point, the client device may be properly configured to communicate on the network.

If the data in the vendor class identifier field does not match data in the list of predetermined data (block 315—NO), then an address outside the particular address group may be identified (block 340) (FIG. 3B). For example, home router 120 may identify an available address from the address pool that is not included in the particular address group.

An offer message may be generated and transmitted to the client device (block 345). For example, home router 120 may generate an offer message that includes the identified address in, for example, the yiaddr field and possibly other configuration parameters in the options field. Home router 120 may transmit the offer message to the client device from which it received the discover message.

The client device may receive the offer message and analyze its contents. The client device may generate a request message that may identify home router 120 and may specify the desired network address and/or configuration parameters. The desired network address may match the address identified in the offer message. The client device may send the request message to home router 120 (e.g., by broadcasting or unicasting).

The request message may be received (block 350). For example, home router 120 may receive the request message and store the network address and/or configuration parameters for the client device in memory.

An acknowledgement message may be generated and transmitted (block 355). For example, home router 120 may generate an acknowledgement message that contains the network address, the configuration parameters, and/or a duration of the lease. Home router 120 may send the acknowledgement message to the client device. The client device may receive the acknowledgement message and check the configuration parameters contained in the acknowledgement message. The client device may also record the duration of the lease. At this point, the client device may be properly configured to communicate on the network.

Figure 6:
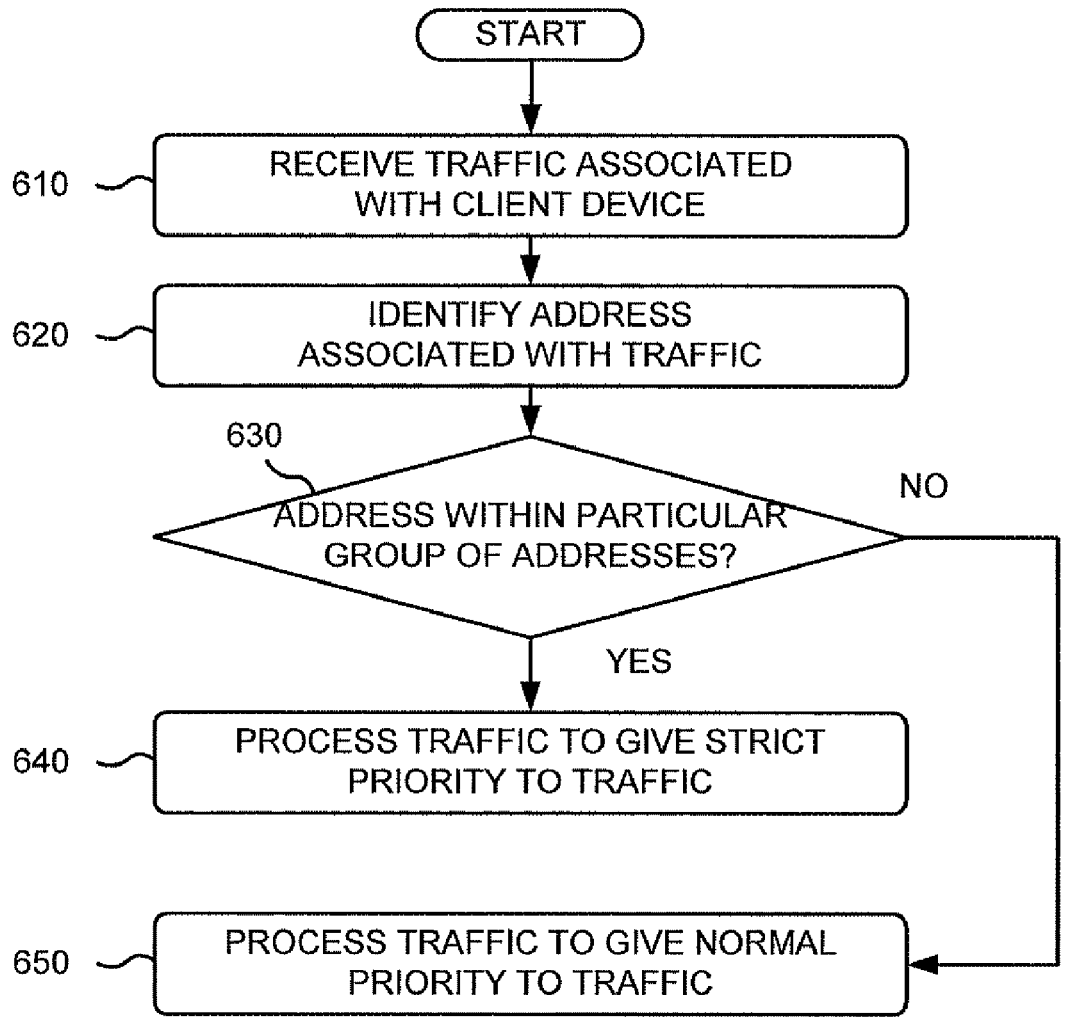
FIG. 6 is a flowchart of an exemplary process for processing network traffic.

FIG. 6 is a flowchart of an exemplary process for processing network traffic. Processing may begin with traffic associated with a client device being received (block 610). For example, home router 120 may receive either traffic intended for the client device ("incoming traffic") or traffic originating at the client device ("outgoing traffic").

The address associated with the traffic may be identified (block 620). For example, in the case of incoming traffic, home router 120 may identify the destination address associated with the traffic. In the case of outgoing traffic, home router 120 may identify the source address associated with the traffic. In other words, for any traffic received by home router 120, home router 120 may identify the address associated with customer premises equipment for which the traffic is intended or from which the traffic originated.

It may be determined whether the identified address is one of the addresses in the particular address group (block 630). If the identified address is included within the particular address group (block 630—YES), then the traffic may be processed to give strict priority to the traffic (block 640). For example, home router 120 may give the traffic strict priority over any best effort or background traffic also being processed by home router 120. This higher (strict) priority may ensure the necessary QoS to provide quality video and/or audio data.

If the identified address is not included within the particular address group (block 630—NO), then the traffic may be processed to give normal priority to the traffic (block 650).

For example, home router 120 may give the traffic its normal priority with regard to other traffic also being processed by home router 120.

Implementations described herein may ensure high quality video and/or audio services by assigning video and/or audio devices in a local network addresses within a predetermined group of addresses and then processing traffic associated with these devices with higher priority over other traffic.

The foregoing description provides illustration and description, but is not intended to be exhaustive or to limit the invention to the precise form disclosed. Modifications and variations are possible in light of the above teachings or may be acquired from practice of the invention.

For example, while series of acts have been described with regard to FIGS. 3A, 3B, and 6, the order of the acts may be modified in other implementations. Further, non-dependent acts may be performed in parallel.

It will be apparent that systems and methods, as described above, may be implemented in many different forms of software, firmware, and hardware in the implementations illustrated in the figures. The actual software code or specialized control hardware used to implement these systems and methods is not limiting of the invention. Thus, the operation and behavior of the systems and methods were described without reference to the specific software code—it being understood that software and control hardware can be designed to implement the systems and methods based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method, comprising:
receiving, by a network device and from a user device of a particular type, a discover message that is based on a dynamic host configuration protocol (DHCP);
determining, by the network device, that the discover message includes a vendor class identifier associated with a hardware configuration of the user device;
determining, by the network device, whether data, associated with the vendor class identifier and included in the discovery message, matches at least one data item of a list of predetermined data, where the at least one data item is associated with the particular type of user device;
assigning, by the network device and to the user device, a first network address from an address group when the data associated with the vendor class identifier matches the at least one data item of the list of predetermined data, where network traffic associated with the first network address is to be processed based on a particular quality of service (QoS) policy associated with the particular type of user device;
assigning, by the network device and to the user device, a second, different network address from another address group when the data associated with the vendor class identifier does not match the at least one data item of the list of predetermined data, where network traffic associated with the second network address is not to be processed based on the particular QoS policy; and
prioritizing, based on the particular QoS policy, the network traffic associated with the first network address over the network traffic associated with the second network address.

2. The method of claim 1, further comprising:
receiving network traffic associated with the user device;
determining whether a network address, from the received network traffic, is within the address group by comparing the network address, from the received network traffic, to one or more network addresses, associated with the address group; and
processing the received network traffic, based on the particular QoS policy, when the network address, obtained from the received network traffic, matches one of the one or more network addresses.

3. The method of claim 2, further comprising:
processing the received network traffic as background traffic or using a policy associated with a best effort when the network address, obtained from the received network traffic, does not match one of the one or more network addresses.

4. The method of claim 1, further comprising:
setting a duration of a lease that permits the first network address to be used by the user device for a particular period of time.

5. The method of claim 1, where the network device provides firewall functionality that includes packet filtering and protection against network attacks.

6. The method of claim 1, where the list of predetermined data, including the at least one data item, corresponds to a group of user devices, of the particular type, that transmit or receive video data.

7. The method of claim 1, where, when the data associated with the vendor class identifier matches the at least one data item of the list of predetermined data, assigning the network address from the address group includes:
generating a first offer message that includes the first network address, and
sending the first offer message to the user device; and
where, when the data associated with the vendor class identifier does not match the at least one data item of the list of predetermined data, assigning the network address from the other address group includes:
generating a second offer message that includes the second network address, and
sending the second offer message to the user device.

8. A device, comprising:
a memory to store a pool of available addresses and data associated with a list of vendor class identifiers associated with a hardware configuration of client devices, where a first group of the pool of available addresses is associated with a particular type of data traffic associated with a particular type of client device and has a first priority that is higher than a second priority associated with a second group of the pool of available addresses, and
where the first priority is associated with a Quality of Service (QoS) policy that indicates that data associated with the first group of the pool of available addresses is processed with priority over data associated with the second group of the pool of available addresses; and
a processor to:
determine that a first discovery message received from a first client device, of the client devices, includes a first vendor class identifier,
determine that data, associated with the first vendor class identifier, matches one or more of a group of the data associated with the list of vendor class identifiers,
determine that a second discovery message received from a second client device, of the client devices, includes a second vendor class identifier that is different from the first vendor class identifier,
determine that data, associated with the second vendor class identifier, does not match one or more of the group of the data associated with the list of vendor class identifiers,
assign, to the first client device, a first address, from the first group of the pool of available addresses based on determining that the data associated with the first vendor class identifier matches one or more of the group of the data associated with the list of vendor class identifiers,
assign, to the second client device, a second, different address, from the second group of the pool of available addresses based on determining that the data associated with the second vendor class identifier does not match one or more of the group of the data associated with the list of identifiers,
determine whether received network traffic is associated with the first client device or the second client device based on an address associated with the received network traffic,
process, based on the QoS policy, the received network traffic with the first priority when the received network traffic is associated with the first client device, and
process the received network traffic with the second priority when the received network traffic is associated with the second client device.

9. The device of claim 8, where the particular group of data of the data associated with the list of vendor class identifiers is associated with client devices that transmit or receive video data or audio data.

10. The device of claim 8, where, when assigning the first address, the processor is further to:
generate a first offer message that includes the first address, and
transmit, to the first client device, the first offer message; and where, when assigning the second address, the processor is further to:
generate a second offer message that includes the second address, and
transmit, to the second client device, the second offer message.

11. The device of claim 8, where, when assigning the first address, the processor is further to:
compare the first vendor class identifier to the group of the data associated with the list of vendor class identifiers, and
determine, based on comparing the first vendor class identifier to the group of the data associated with the list of vendor class identifiers, that the first client device comprises the particular type of client device, where the first address is assigned based further on the client device comprising the particular type of client device.

12. The device of claim 8, where, when determining whether the received network traffic is associated with the first client device or the second client device, the processor is further to:
compare the address associated with the received network traffic with the first address and the second address,
determine that the network traffic is associated with the first client device when the address matches the first address, and
determine that the network traffic is associated with the second client device when the address matches the second address.

13. The device of claim 8, where, when assigning the first address, the processor is to:
assign a duration of a first lease that permits the first address to be used by the first client device for a period of time; and
where, when assigning the second address, the processor is to:
assign a duration of a second lease that permits the second address to be used by the second client device for another period of time.

14. The device of claim 8, where the processor is further to:
receive, from another client device, a message that does not include a vendor class identifier, and
assign, to the other client device, an address that is not from within the first group of the pool of available addresses or the second group of the pool of available addresses based on the message not including the vendor class identifier.

15. A device, comprising:
a memory to store a pool of available addresses and a list of data items associated with a plurality of vendor class identifiers, the plurality of vendor class identifiers are associated with client devices that each comprise an audio device or a video device; and
a processor to:
receive, from a client device, a discover message that is based on a dynamic host configuration protocol (DHCP),
assign, to the client device, a particular network address from an address group, within the pool of available addresses, when the discovery message includes a vendor class identifier that corresponds to one of the data items of the list of data items, where network traffic with a network address within the address group is to be given a first priority and network traffic with a network address outside of the address group is to be given second, different priority, where the first priority comprises a higher priority relative to the second priority, where the first priority given to the network traffic with network addresses within the address group is associated with a quality of service (QoS) policy that indicates that the network traffic with the network address within the address group is to be processed with priority over the network traffic with the network address outside the address group;
send, to the client device, an offer message that includes the particular network address,
receive, from the client device, a request message that includes the particular network address, and
generate an acknowledgement message that includes the particular address and a lease, the lease indicating a period of time for which the particular network address is to remain valid.

16. The device of claim 15, where the processor is further to:
receive network traffic associated with the client device;
determine that a network address, obtained from the received network traffic, is not within the address group; and
process the received network traffic after giving priority to network traffic with the network address within the address group.

17. The device of claim 8, where the processor is further to:
process the received network traffic as background traffic or using a policy associated with a best effort when the received traffic is not associated with the first client device or the second client device.

18. The device of claim 15, where the processor is further to:
determine whether received network traffic is associated with the client device based on an address associated with the received network traffic,
process, based on the QoS policy, the received network traffic with the first priority when the received network traffic is associated with the client device, and
process the received network traffic with the second priority when the received network traffic is not associated with the client device.

* * * * *